E. J. BLACKMON.
COTTON CLEANING AND EXTRACTING MACHINE.
APPLICATION FILED OCT. 1, 1915.
1,174,224.
Patented Mar. 7, 1916.
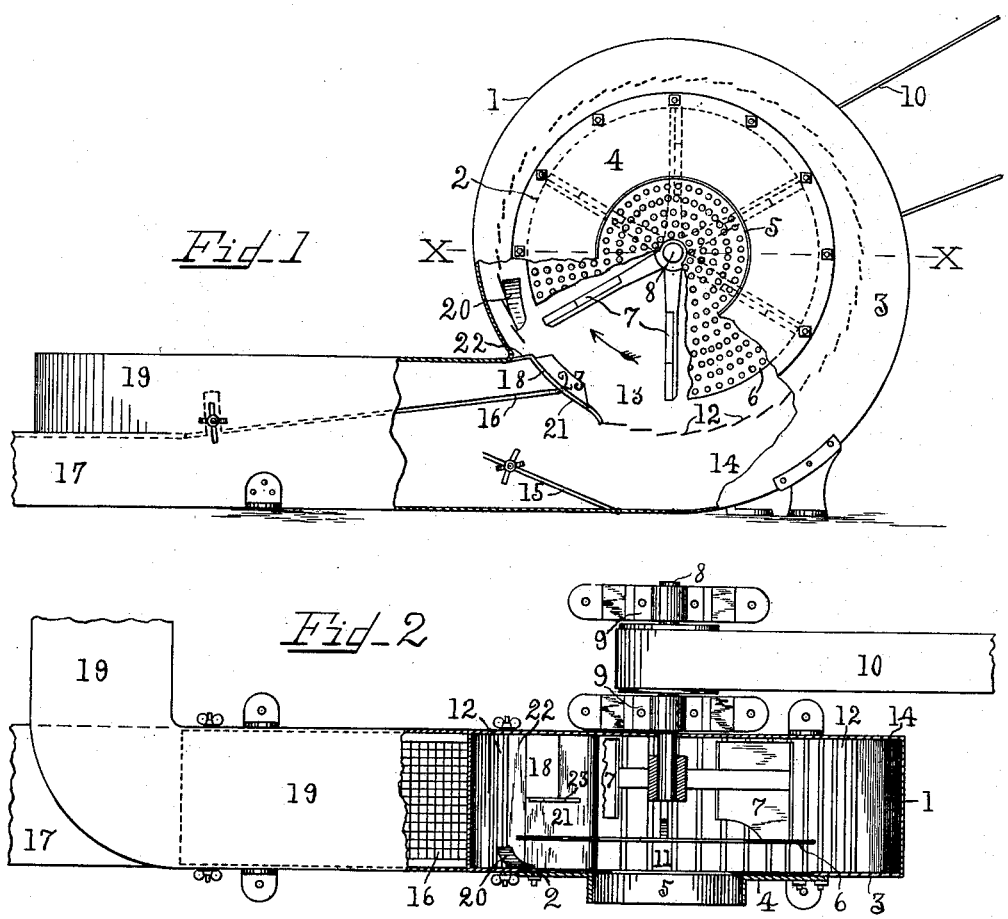
Witnesses.
Grover Cantrell.
Maurice Miller.
Inventor.
Enoch J. Blackmon.
J. P. Dederick.
By
Attorney.

UNITED STATES PATENT OFFICE.

ENOCH J. BLACKMON, OF SHERMAN, TEXAS.

COTTON CLEANING AND EXTRACTING MACHINE.

1,174,224.  Specification of Letters Patent.  Patented Mar. 7, 1916.

Application filed October 1, 1915. Serial No. 53,537.

*To all whom it may concern:*

Be it known that I, ENOCH J. BLACKMON, a citizen of the United States, residing at Sherman, in the county of Grayson and State of Texas, have invented certain new and useful Improvements in Cotton Cleaning and Extracting Machines, of which the following is a specification.

This invention relates to cotton extracting and cleaning machines, and may be used either in conjunction with a gin to clean hand picked cotton and better prepare it for the ginning operation, or it may be used for extracting cotton from unripe and closed bolls. The agencies employed in performing the functions of the present construction are both mechanical and pneumatic and carried out by means of a suction fan, whereby the cotton from a wagon or bin entering it at the side is carried around within a cylindrical chamber formed of inclined staves which thresh and separate the cotton from the hulls and pass it through the staves to a discharge flue extending from the bottom of the fan case to gin stands.

By the special construction of parts hereinafter described and claimed, as well as by the general combination, arrangement and coöperation of the elements entering into the machine as a whole, I have devised a machine which will operate in a continuous and highly efficient manner to separate impurities from said cotton, or with equal efficiency to crush bolls, open or closed, and separate the cotton thereof from the hulls.

In the accompanying drawings which serve to illustrate this invention more fully, Figure 1, is a side elevation, a portion being broken away to disclose interior mechanism. Fig. 2 is a plan view partly in section through the line X X of Fig. 1, and with portions broken away to clearly show more important interior features.

In the embodiment of the invention shown in the drawings 1 represents a suction fan or blower having a circular opening 2 in the front side 3, over which opening is bolted a plate 4, provided with an opening 5 that is connected through the usual conveyer trunk (not shown) with a telescopic section, said telescopic section being adapted to rest in the bin or wagon from which the seed cotton is to be elevated. The fan 1 is equipped with a rotor comprising a perforated disk 6 secured to the edges of fan wings 7, all mounted on a shaft 8 that is supported in the usual bearings 9, and may be driven from any convenient point by belt 10. The wings 7 are not as wide as the interior width of the fan casing, so a space 11 is formed between the disk 6 and the plate 4 in which the cotton to be cleaned first enters. A cylindrical wall is formed within the fan casing by a plurality of laterally disposed, inwardly inclined metal staves 12, spaced apart and secured to the sides of the casing in any suitable manner, said wall forming a cylindrical chamber 13 in which the fan revolves. The perforated disk 6' prevents the cotton entering the fan from passing to the fan wings, hence the air blast carries it to the periphery of the fan which threshes it around against the inwardly inclined edges of the staves, thus removing the seed cotton from the hulls and blowing it through between the adjacent edges of the staves to a chamber 14, around which it travels to the bottom of the fan where it attains a horizontal course and contacts an adjustable deflector 15, that directs it against a longitudinally disposed inclined screen 16 having a mesh suitable only for the passage of small trash and dust; the cotton passing along beneath the screen, and through a conduit 17, to the cotton gin. A little intermixture of hulls, husks and other foreign matter may also be carried with the seed cotton, but will readily be separated from the lint by the ginning process.

All hulls, stems and trash too large to pass between the edges of the staves 12, will be threshed around in the chamber 13, and by the constant inlet flow of cotton at the front side, gradually forced to the back side of the fan case, and out through an opening 18, into a conduit 19 that may be extended to a point outside of the gin house. An inwardly curved deflector 20, secured in the chamber 13, also tends to deflect the hulls in the desired direction. The opening 18 is formed in a metal plate 21, which is curved to conform to the circle formed by the inclined staves 12, and a laterally disposed baffle portion 22 of the plate extends to the fan casing, preventing separated trash from entering the chamber 14, and to strengthen the plate a centrally located rib 23 is also provided.

From the foregoing description it will be seen that I provide a cotton extracting and cleaning machine that is exceedingly simple in construction and efficient in operation, and while I have shown and described a specific embodiment of means for carrying the principles of my invention into practical operation, I desire it to be understood that the specific form shown, while the best form in which I at present contemplate carrying my invention into practical operation, is merely illustrative of an operative embodiment of practical means, and I do not limit or confine myself thereto; but,—

Having now set forth the object and nature of my invention and a form of apparatus embodying the same and having described the construction, function, and mode of operation thereof, what I claim as new and desire to secure by Letters Patent, is—

1. A device of the class described comprising a fan casing, a circular wall within the casing formed of transversely disposed inclined staves supported by the sides of said casing and forming a cylindrical chamber, a fan positioned in said chamber, a deflector disposed in the chamber adjacent to the cylindrical wall, a trash conducting conduit, said conduit having communication with the fan chamber through an opening in the cylindrical wall, as set forth.

2. In a machine of the class described, in combination with a fan-casing and a fan positioned therein, a circular wall formed of transverse staves dividing the space between the periphery of the fan wings and the outer shell of the casing into an inner and an outer cylindrical chamber, said staves being so positioned and disposed as to present one edge of each in a position to form a serrated inner surface of the wall for disintegrating the cotton burs, a clearance space between the edges of the staves to afford an uninterrupted passage from the said inner chamber between them, whereby the cotton as extracted from the burs may be readily passed by the air blast through said spaces to the outer chamber of the fan, and thence through a conduit leading to a cotton gin.

3. In a machine of the class described, in combination with a fan casing and a fan positioned therein, a serrated circular wall formed of staves spaced apart for the passage of cotton, and positioned exterior of the fan, dividing the intervening space between the fan and the outer shell of the casing into an inner and an outer cylindrical chamber, an opening through the wall into a conduit for the passage of hulls and trash from the inner chamber, the outer chamber of the fan conducting and passing the cotton received therein to a conduit having a deflector member disposed and adjacent to the mouth thereof, causing the cotton to pass along beneath an inclined horizontally disposed screen, and thence to a cotton gin.

In testimony whereof I affix my signature in presence of two witnesses.

ENOCH J. BLACKMON.

Witnesses:
GROVER CANTRELL,
MAMIA MILLER.